United States Patent Office.

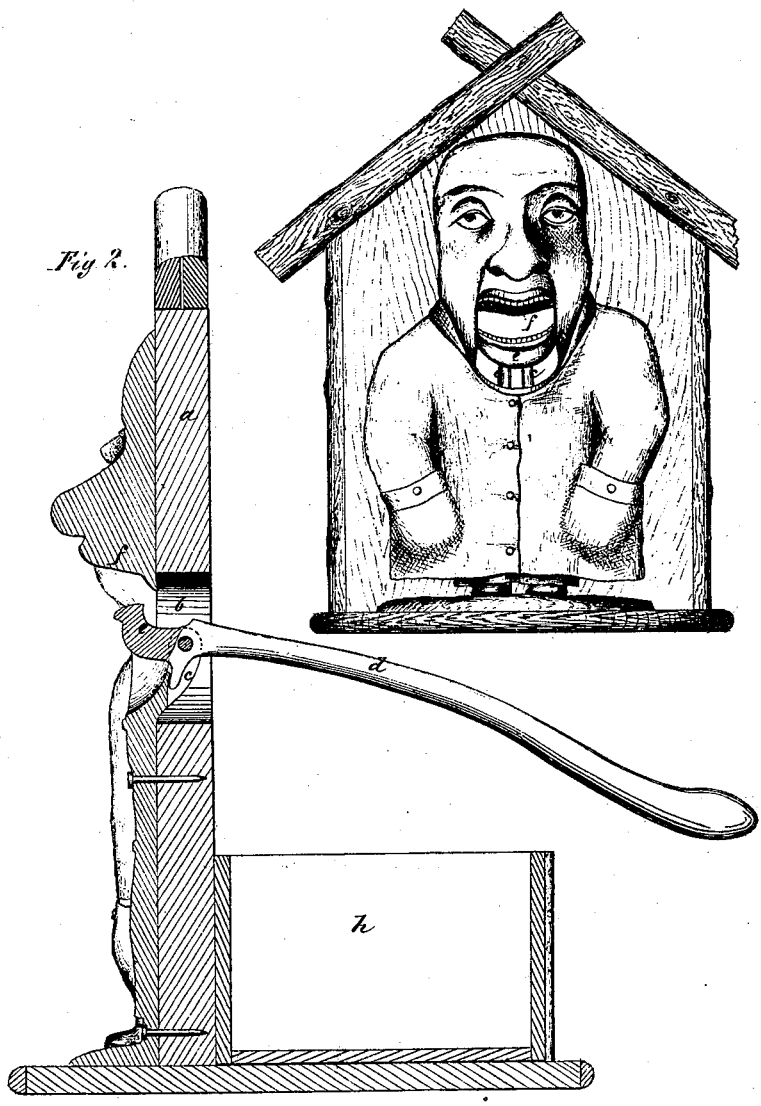

PAUL CEREDO, OF DUSSELDORF, PRUSSIA.

Letters Patent No. 109,495, dated November 22, 1870.

IMPROVEMENT IN NUT-CRACKERS.

The Schedule referred to in these Letters Patent and making part of the same.

*To all whom it may concern:*

Be it known that I, PAUL CEREDO, of Dusseldorf, in the province of Rhine and Kingdom of Prussia, have invented a new and improved Nut-Cracker; and I do hereby declare the following to be a full, clear, and exact description of the same, reference being had to the accompanying drawing making a part of this specification, in which—

Figure 1 is a front elevation, and

Figure 2 is a sectional elevation on a reduced scale.

This invention consists in the combination of a vertical standard, in which is a transverse orifice, with a lever pivoted between a pair of lugs which extends from the standard into said orifice, a dish or bowl of suitable size to hold a nut being formed in said lever at the end of its shorter arm, and with a ledge which projects from the front of said standard above the bowl of the lever, and at such a distance from it that, when the lever is lowered, a nut placed in its bowl will be compressed between the same and the ledge above, and its shell crushed.

The invention also consists in the combination with the standard, lever, and ledge, of a basket or other vessel secured to the rear of the standard, beneath the said orifice, for the purpose of receiving cracked nuts, shells, &c.

In the drawing—

*a* is the vertical standard.

*b*, the transverse orifice in the standard.

*c*, one of the two lugs which extend upward and backward from the standard into the orifice.

*d* is the lever, which is pivoted between the lugs.

*e* is the nut-holder that is formed in the front end of the lever.

*f* is the ledge which extends from the front of the standard above the nut-holder.

*h* is the basket which is secured to the rear of the standard below the orifice for the reception of shells, &c.

It is obvious that the effectiveness of this device will be in proportion to the weight or length of the lever *d*.

My design is to render the apparatus ornate to such an extent as may fit it to be placed upon dining-tables. I have, therefore, in this instance, attached a plaster or metallic caricature of the human figure to the front of the standard, whose upper jaw is formed by the ledge *f*, and whose lower jaw consist of the nut-holder *e*.

Having thus described my invention, to which I have given the name of "The Automatic Nut-Cracker,"

What I claim as new, and desire to secure by Letters Patent, is—

The standard *a*, ledge *f*, lever *d*, nut-holder *e*, and basket *h*, all arranged as described.

PAUL CEREDO.

Witnesses:
CHARLES LEGGE,
CHARLES G. C. SIMPSON.